US008223927B2

(12) United States Patent
Di Serio et al.

(10) Patent No.: US 8,223,927 B2
(45) Date of Patent: Jul. 17, 2012

(54) LAWFUL INTERCEPTION OF NON-LOCAL SUBSCRIBERS

(75) Inventors: Luca Di Serio, Nocera Inferiore (IT); Raffaele De Santis, Mercato San Severino (IT); Roberto Cicco, Cava de Tirreni (IT); Rita Di Donato, Cava de' Tirreni (IT); Biagio Maione, Naples (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 159 days.

(21) Appl. No.: 12/867,815

(22) PCT Filed: Feb. 14, 2008

(86) PCT No.: PCT/SE2008/050175
§ 371 (c)(1),
(2), (4) Date: Aug. 16, 2010

(87) PCT Pub. No.: WO2009/102245
PCT Pub. Date: Aug. 20, 2009

(65) Prior Publication Data
US 2010/0316195 A1    Dec. 16, 2010

(51) Int. Cl.
H04M 1/24       (2006.01)
H04M 3/08       (2006.01)
H04M 3/22       (2006.01)

(52) U.S. Cl. .............. 379/32.01; 379/35; 455/414.1

(58) Field of Classification Search .............. 379/1.01, 379/7, 32.01, 32.05, 35; 455/414.1, 417, 455/432.1, 432.3, 455
See application file for complete search history.

(56) References Cited

U.S. PATENT DOCUMENTS

| | | | |
|---|---|---|---|
| 7,324,499 B1* | 1/2008 | Borella et al. | 370/349 |
| 2004/0228362 A1* | 11/2004 | Maki et al. | 370/467 |
| 2005/0210127 A1* | 9/2005 | Pohja et al. | 709/224 |
| 2006/0052093 A1* | 3/2006 | Bui | 455/417 |
| 2010/0150138 A1* | 6/2010 | Bjorsell et al. | 370/352 |

FOREIGN PATENT DOCUMENTS

WO    WO 2006/071158 A1    6/2006

* cited by examiner

Primary Examiner — Binh Tieu

(57) ABSTRACT

The present application relates to monitoring non-local originating calls in a telecommunication system having a local network part and a non-local network part. A monitoring centre is attached to an Intercept Access Point in the local network part. A monitoring request comprising an external target identification is received from the monitoring centre to the Intercept Access point. A call is set-up of from an originating subscriber in the non-local network part, towards the local network part. An Initial Address Message comprising the originating subscriber's identity is received to the Intercept Access point from the non-local network part. A match is found between the Initial Address Message and the received target identification. Monitoring information related to the matched target is transferred from the Intercept Access Point to the monitoring centre.

15 Claims, 7 Drawing Sheets

PRIOR ART

LAWFUL INTERCEPTION OF NON-LOCAL SUBSCRIBERS

TECHNICAL FIELD

The present invention relates to methods and arrangements in a telecommunication system to monitor external calls from non-local subscribers.

BACKGROUND

According to the 3GPP standard, a subscriber can be intercepted based on Mobile Station International ISDN Number MSISDN, International Mobile Subscriber Identity IMSI and International Mobile Equipment Identity IMEI only if roaming under the Mobile Switching Centre MSC acting as interception node; or in The Gateway Mobile Switching Centre GMSC, the roaming leg can be intercepted based on IMSI and MSISDN of the B-party. The 3GPP standard does not foresee the possibility, for an MSC acting as interception node, to intercept incoming calls originated from subscribers belonging to external networks or from subscribers belonging to external nodes. Subscribers belonging to external networks/nodes are in this patent application referred to with the term "non local subscribers".

FIG. 1 is part of the prior art and discloses an Intercept Mediation and Delivery Unit IMDU, also called Intercept Unit, that is a solution for monitoring of Interception Related Information IRI and Content of Communication CC for a target. The different parts used for interception are disclosed in current Lawful Interception standards (see 3GPP TS 33.108 and 3GPP TS 33.107—Release 7). A Law Enforcement Monitoring Facility LEMF is connected to three Mediation Functions MF, MF2 and MF3 respectively for ADMF, DF2, DF3 i.e. an Administration Function ADMF and two Delivery Functions DF2 and DF3. The Administration Function and the Delivery Functions are each one connected to the LEMF via standardized handover interfaces HI1-HI3, and connected via interfaces X1-X3 to an Intercepting Control Element ICE in a telecommunication system. Together with the delivery functions, the ADMF is used to hide from ICEs that there might be multiple activations by different Law Enforcement Agencies. Messages REQ sent from LEMF to ADMF via HI1 and from the ADMF to the network via the X1 interface comprise identities of a target that is requested to be monitored. The Delivery Function DF2 receives Intercept Related Information IRI from the network via the X2 interface. DF2 is used to distribute the IRI to relevant Law Enforcement Agencies via the HI2 interface. Intercept Related Information IRI, received by DF2 is triggered by Events that in Circuit Switching domain are either call related or non-call related. In Packet Switching domain the events are session related or session unrelated. The Delivery Function DF3 receives Content of Communication CC, i.e. speech and data, on X3 from the ICE. In Circuit Switching, DF3 is responsible for call control signaling and bearer transport for an intercepted product.

3GMS shall provide access to the intercepted Content of Communications and the Intercept Related Information of the mobile target on behalf of Law Enforcement Agencies (see 3GPP TS 33.106 "Lawful interception architecture and functions" release 6). A mobile target in a given 3GMS can be a subscriber of that 3GMS, or a user roaming from another 3GMS or from any other network capable of using that 3GMS (such as a GSM or mobile satellite). The intercepted CC and the IRI can only be delivered for activities on that given 3GMS. For interception, there needs to be a means of identifying the target, correspondent and initiator of the communication. According to standards, target identities used for interception of CS and GPRS service shall be MSISDN, IMEI and IMSI.

SUMMARY

According to the current LI standards, it is not possible to provide the Lawful Enforcement Monitoring Facilities with the interception of a call based on the calling party number belonging to a non-local network part such as an external network or an external node. The monitoring of an A-subscriber is possible only if invoked in a node where the call is originated. This causes problems since monitoring of subscribers from defined networks and/or operators hereby is prevented.

The problem is solved by the invention by introducing a new target identity, beyond MSISDN, IMSI and IMEI, that specifies a non-local originating number. If a warrant is issued by a Law Enforcement Monitoring Facility, reporting a non-local originating number, the calls incoming to a GMSC or a terminating MSC will be intercepted if the calling party number matches with the non-local originating number. The possibility to specify incomplete non-local numbers like for example only the Country Code is also foreseen and in this way all the incoming calls where the calling party number begins with that country code will be intercepted. This is useful for intercepting all the calls coming from a sensitive area.

More in detail, the problems are solved by the invention by a method to monitor non-local calls in a telecommunication system comprising a local network part and a non-local network part. A monitoring centre is attached to an Intercept Access Point in the local network part. The method comprises the following steps:

A monitoring request comprising target identification is received from the monitoring centre to the Intercept Access Point. The target identification can for example be an external A number or an incomplete calling party number representing a sensitive area.

A call is set-up from an originating subscriber in the non-local network part, to the local network part.

An originating subscriber identity for example embedded in an Initial Address Message is received to the Intercept Access Point from the non-local network part.

A match is found between the Initial Address Message and the received target identification.

Information related to the matched target is transferred from the Intercept Access Point to the monitoring centre.

An object of the invention is to make interception of non-local originating subscribers/terminals possible. This object and others are achieved by methods, arrangements, nodes, systems and articles of manufacture.

In a first embodiment of the invention, the local network part of the telecommunication system is a first telecommunication network such as a first Public Land Mobile Network and the non-local network part is a second telecommunication network for example a second Public Land Mobile Network or a Public Switched Telephone Network. The monitoring centre is in the first embodiment attached to an Intercept Access Point (Gateway Mobile Switching Centre) in the local telecommunication network.

In a second embodiment of the invention, the local network part of the telecommunication system is a first node such as a first Mobile Switching Centre within a Public Land Mobile Network and the non-local network part is a second node such as a second Mobile Switching Centre in the same Public Land Mobile Network. The monitoring centre is attached to the first node.

Some advantages of the invention are as follows:

With telecommunication and IT actors investing in VoIP, there is a growing market for telephony via web. Some customers have introduced a new service called GSM on the WEB. GMSCs in the network will be connected to GOW solution. LI solution is required in all cases by legal authorities and there is no possibility to monitor originated calls from GOW via web into the network from existing GMSC LI functionality. The only way to intercept calls originated from GOW, is the triggering of the monitoring checking the A-number when an incoming call enters the GMSC. In some countries the authorities are charged for LI related activities and the operators have a substantial income from these activities. This feature increases the amount of traffic towards the monitoring agencies, so an increase of revenues is expected for the operator in these countries. In addition, for Mobile Virtual Network Operators, the feature is the only way to fulfill the legal requirement of provisioning LI feature. In IMS interworking scenario, calls originated and terminated in IMS domain, but transiting for a GMSC with MGCF, can be intercepted in GMSC only acting on non local A parties and B parties numbers.

The invention will now be described more in detail with the aid of preferred embodiments in connection with the enclosed drawings.

DETAILED DESCRIPTION

Figure 2:
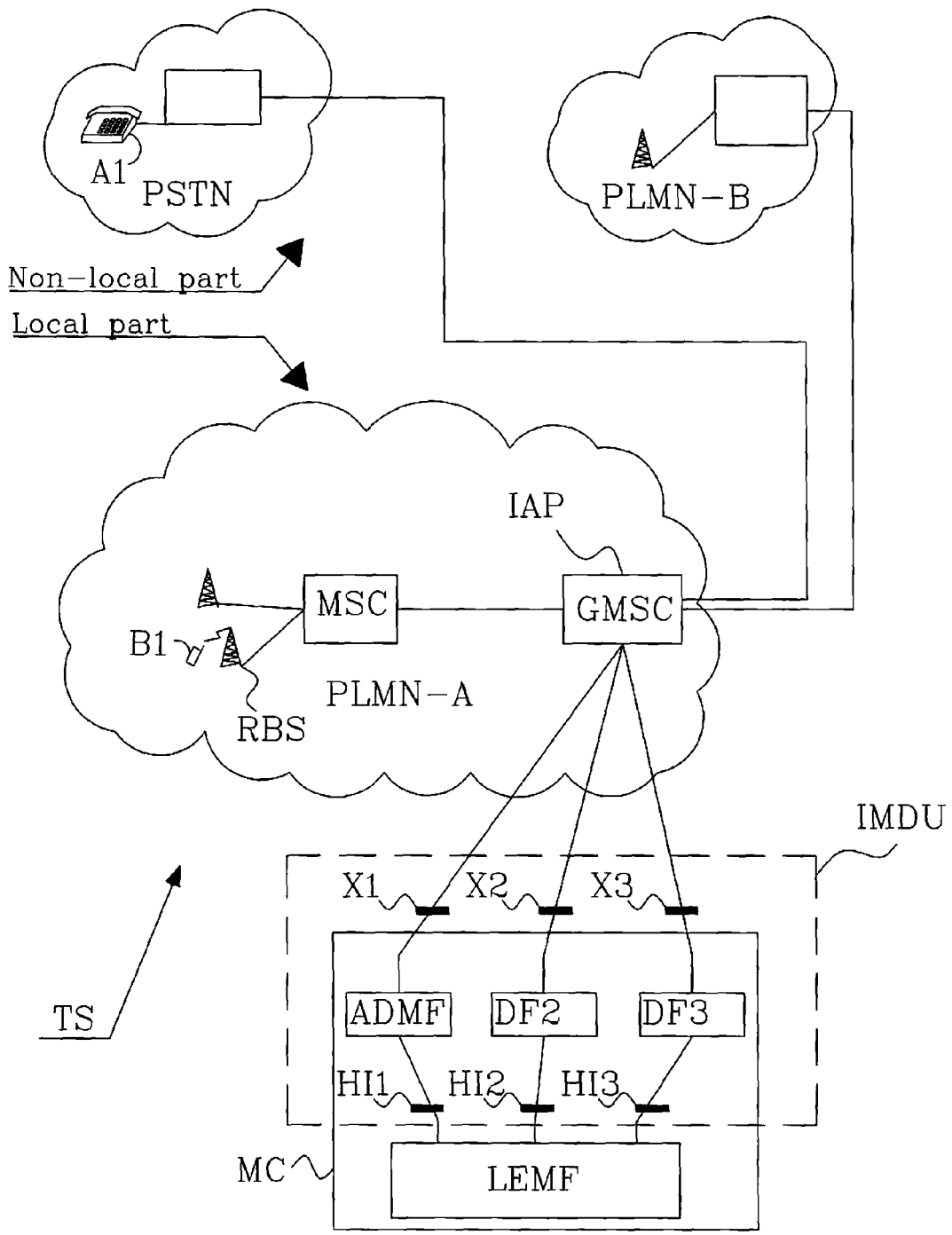
FIG. 2 discloses a block schematic illustration of an Intercept Mediation and Delivery Unit attached to a Gateway Mobile Switching Centre in a Public Land Mobile Network whereby an external call is incoming from a non-local Public Switched Telephone Network.

FIG. 2 discloses a block schematic illustration of telecommunication networks in a Telecommunication System TS. A first Public Land Mobile Network PLMN-A, a second Public Land Mobile Network PLMN-B and a Public Switched Telephone Network PSTN can be seen in FIG. 2. The first Public Land Mobile Network PLMN-A, also called a local network part PLMN-A, comprises a Gateway Mobile Switching Centre GMSC. The GMSC is attached to a Radio Base Station RBS via a Mobile Switching Centre MSC. A Monitoring Centre MC comprising an Intercept Mediation and Deliver Unit IMDU is schematically disclosed in FIG. 2. The Intercept Unit IMDU has already been explained in the background part of this patent application. The Monitoring Centre is attached to the GMSC via the interfaces X1, X2 and X3. The GMSC is in this example acting as Intercept Access point IAP. The second Public Land Mobile Network PLMN-B and the Public Switched Telephone Network PSTN, also called non-local network parts, are both attached to the first Public Land Mobile Network PLMN-A via the GMSC. A fixed terminal A1 in PSTN and a mobile terminal B1 within the RBS radio coverage area in PLMN-A can be seen in FIG. 2.

Figure 1:
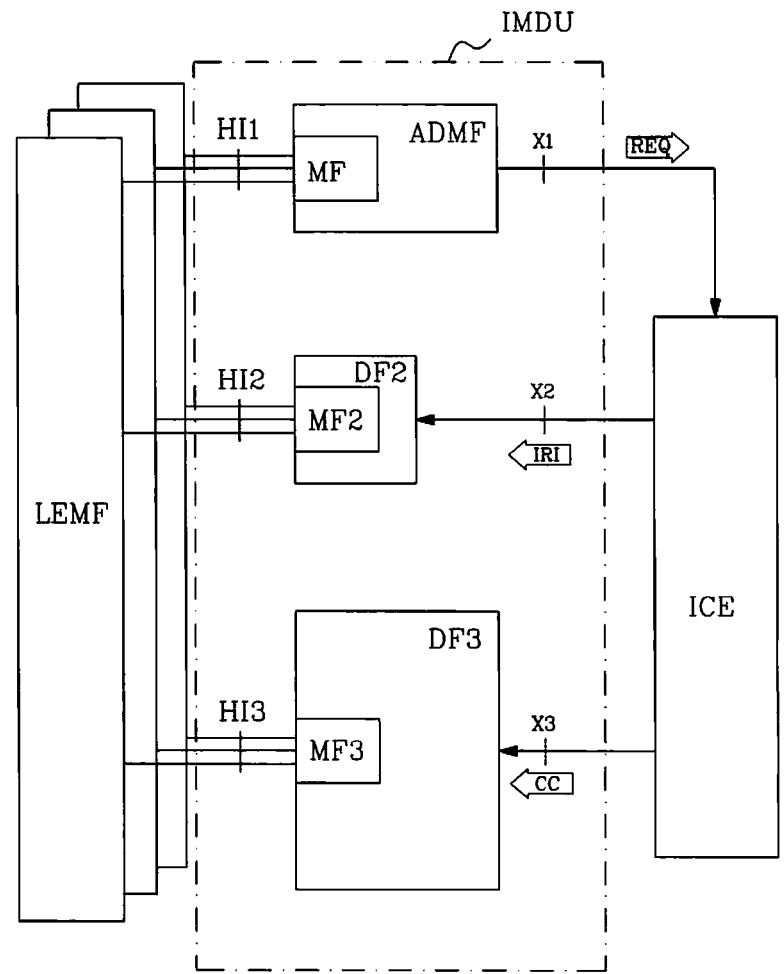
FIG. 1 is part of the prior art and discloses a block schematic illustration of an Intercept Mediation and Delivery Unit attached to an Intercepting Control Element.
Figure 3:
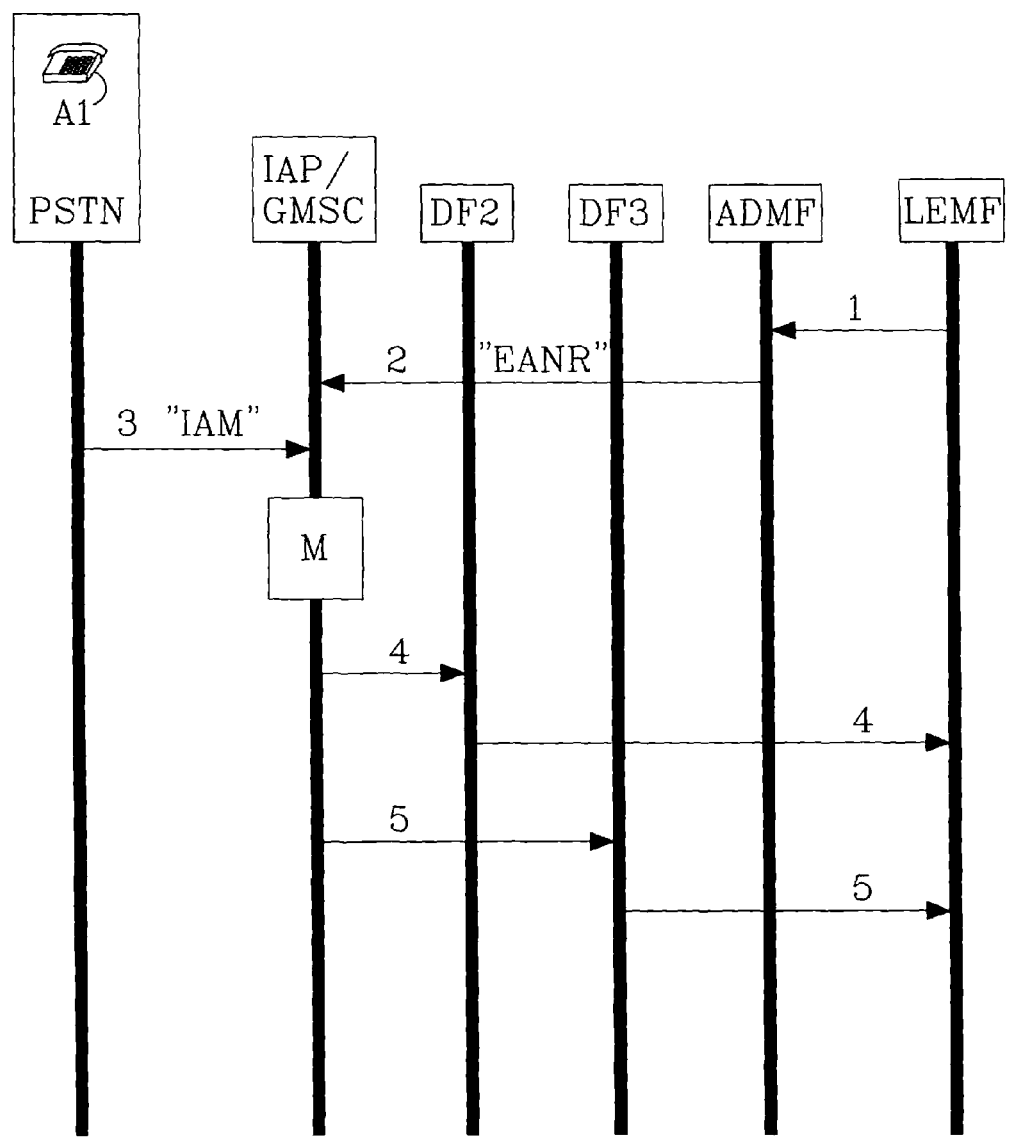
FIG. 3 discloses a signal sequence diagram representing a method for monitoring an incoming call from the non-local Public Switched Telephone Network.

A first embodiment of the invention is disclosed in FIG. 3. FIG. 3 is to be read together with FIGS. 1 and 2. FIG. 3 discloses a signal sequence diagram representing a method for monitoring an incoming call from the non-local Public Switched Telephone Network PSTN.

The method according the first embodiment comprises the following steps:

A request 1 for non-local interception is sent from the Law Enforcement Monitoring Facility LEMF to the Administration Function ADMF on the interface HI1. The LEMF requires the non-local interception by sending an External A NumbeR EANR as interception target, i.e. an international E.164 number. In this example EANR is equal to +461189497094 and corresponds to the number of the subscriber/fixed terminal A1.

The request is forwarded 2 from the ADMF to the Intercept Access point IAP i.e. to the Gateway Mobile Switching Centre GMSC, on the interface X1.

A subscriber sets up a call from the fixed terminal A1 in PSTN to the mobile terminal B1 in PLMN-A. When a call is placed to an out-of-switch number, an originating Service Switching Point transmits an ISUP Initial Address Message IAM to reserve an idle trunk circuit from the original switch to the destination switch. In this example as can be seen in FIG. 3, the IAM is sent 3 from the PSTN to the GMSC in the PLMN-A. The IAM includes the dialed digits comprising national destination code and B1 subscriber number, and the originating subscriber identity e.g. the calling party A1's number in international E.164 format.

The Initial Address Message IAM is analyzed in GMSC whereby the calling party number is detected in IAM. The calling party number is compared/matched in GMSC with the External A NumbeR EANR received from the LEMF. Analyze and match is represented in FIG. 3 with a reference sign M.

A match is found between the calling party A1's number detected in the Initial Address Message IAM and the received target identification EANR.

Intercept Related Information IRI related to the target A1 is sent 4 from IAP/GMSC to the Law Enforcement Monitoring Facility LEMF via the Delivery Function DF2.

Contents of Communications CC related to the target A1 is sent 5 from IAP/GMSC to the Law Enforcement Monitoring Facility LEMF via the Delivery Function DF3.

As an alternative to the example above, instead of the LEMF requiring the non-local interception by sending an External A NumbeR EANR as interception target, i.e. an international E.164 number, an incomplete EANR can be sent. In this way all the incoming calls where the calling party number begins with that country code will be intercepted. This is useful for intercepting all calls coming from a sensitive area.

Figure 4:
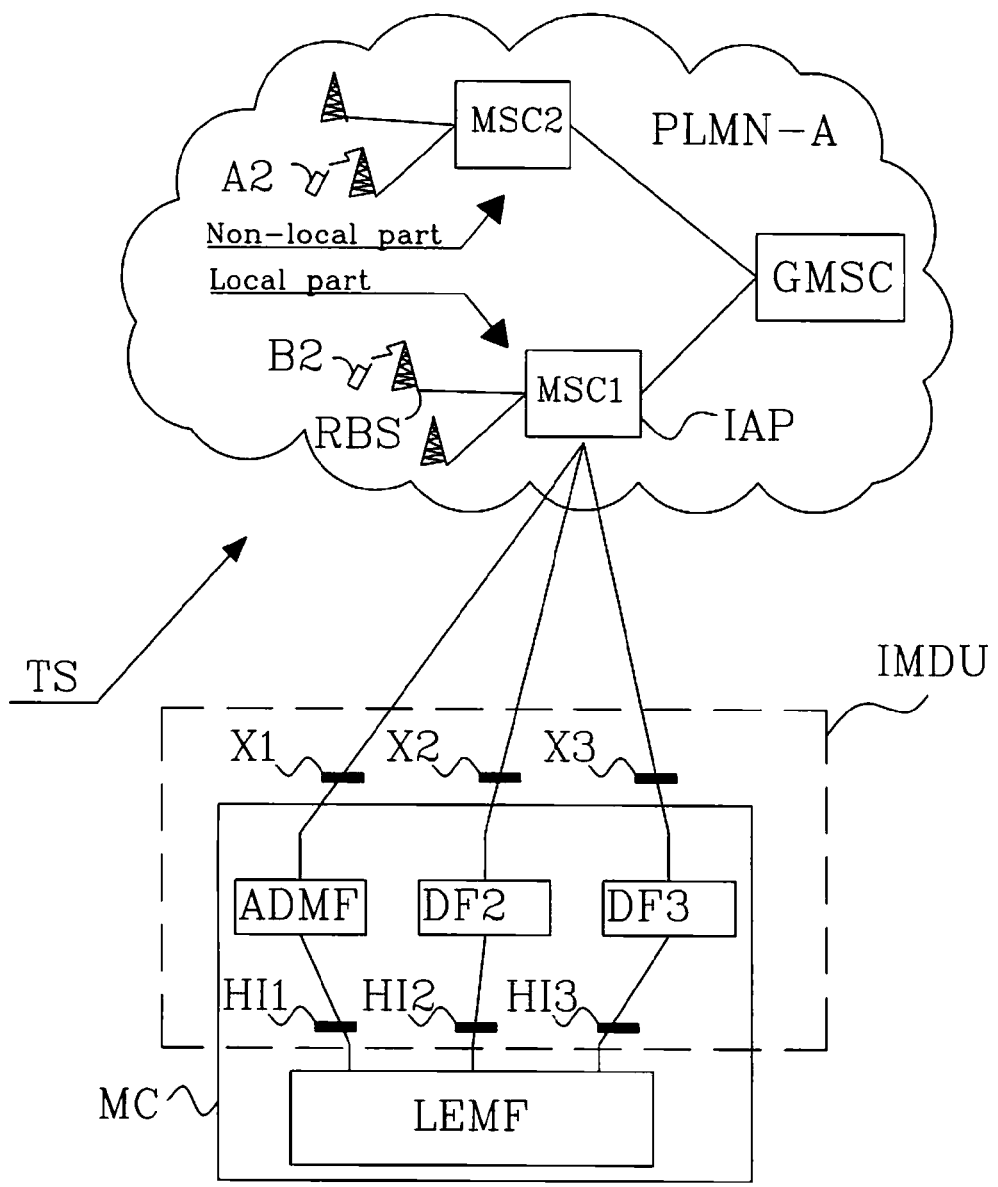
FIG. 4 discloses a block schematic illustration of an Intercept Mediation and Delivery Unit attached to a first Mobile Switching Centre in a Public Land Mobile Network whereby an external call is incoming from a second Mobile Switching Centre in the Public Land Mobile Network.

FIG. 4 discloses a block schematic illustration of a telecommunication network PLMN-A. The network in the example is of GSM-type and comprises a Gateway Mobile Switching Centre GMSC attached to two nodes i.e. to two Mobile Switching Centres MSC1 and MSC2. In this example a mobile terminating subscriber/terminal B2 is located within a radio coverage area of a radio base station RBS in a first node MSC1. The first node is also referred to as the local network part of PLMN-A. A mobile originating subscriber/terminal A2 is located within a radio coverage area of a radio base station RBS in a second node MSC2 which second node also is called the non-local network part of PLMN-A. Like in the first embodiment, a Monitoring Centre MC comprising an Intercept Mediation and Deliver Unit IMDU is schematically disclosed in FIG. 4. The Intercept Unit IMDU has already been explained in background part of this patent application. The Monitoring Centre is attached to the first node MSC1 via the interfaces X1, X2 and X3. The MSC1 is in this example acting as Intercept Access point IAP.

Figure 5:
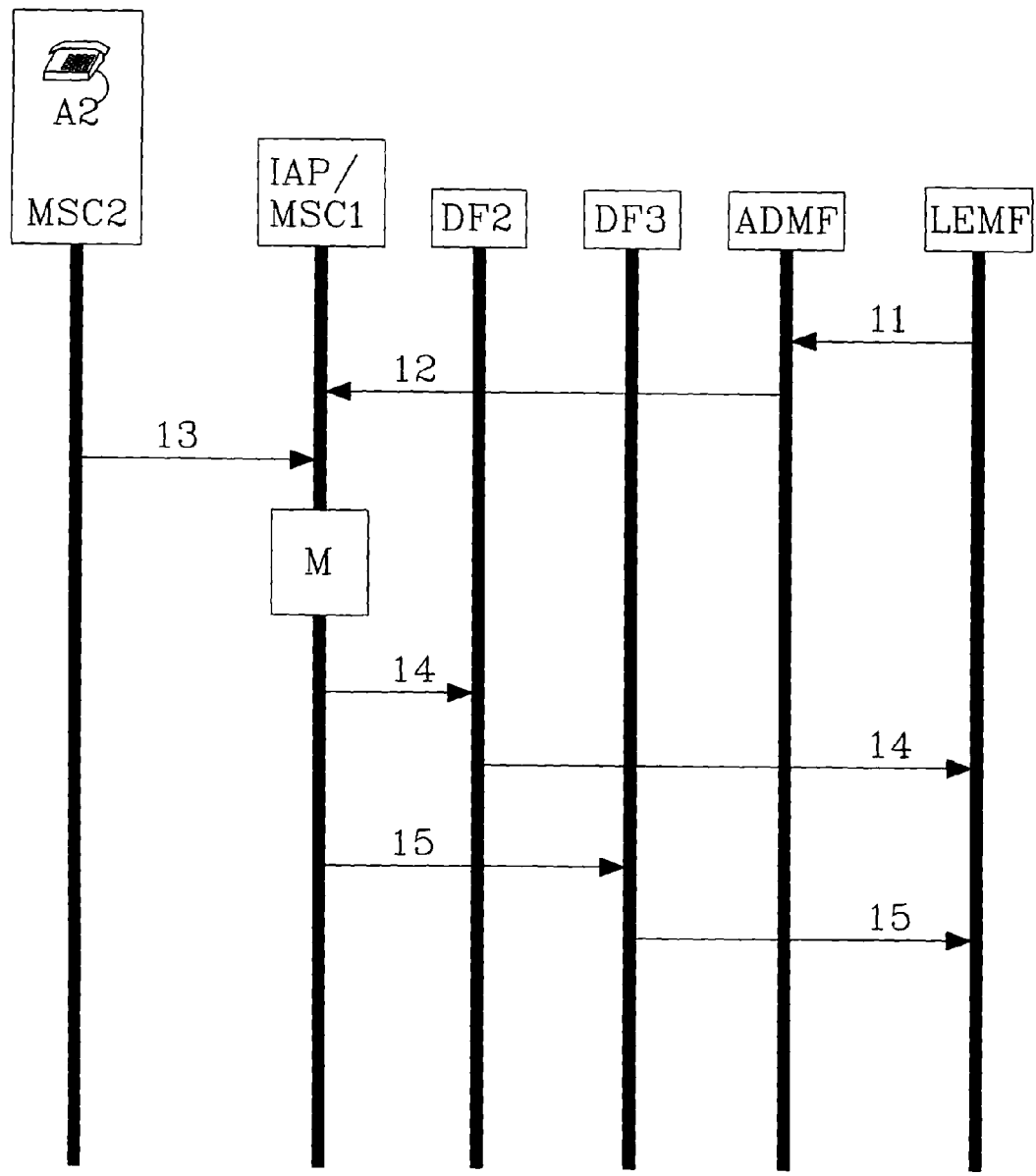
FIG. 5 discloses a signal sequence diagram representing a method for monitoring of an incoming call from the non-local Mobile Switching Centre.

A second embodiment of the invention is disclosed in FIG. 5. FIG. 5 is to be read together with FIGS. 1 and 4. FIG. 5 discloses a signal sequence diagram representing a method for monitoring an incoming call from the non-local network part i.e. from the node MSC2.

The method according the first embodiment comprises the following steps:

A request 11 for non-local interception is sent from the Law Enforcement Monitoring Facility LEMF to the Administration Function ADMF on the interface HI1. The LEMF requires the non-local interception by sending an External A NumbeR EANR as interception target, i.e. an international E.164 number. In this example EANR is equal to +46730255911 and corresponds to the number of the subscriber/mobile terminal A2.

The request is forwarded 12 from the ADMF to the Intercept Access point IAP i.e. to the Mobile Switching Centre MSC1, on the interface X1.

A subscriber sets up a call from the mobile terminal A2 in MSC2 to the mobile terminal B2 in MSC1 via the GMSC, after interrogation of a Home Location Register. The MSC2 transmits an ISUP Initial Address Message IAM to reserve an idle trunk circuit from the original switch to the destination switch, in this example as can be seen in FIG. 5, the IAM is sent 13 from the MSC2 in PLMN-A to the MSC1 in the PLMN-A. The IAM includes the dialed digits comprising B2's subscriber number, and the calling party A2's number in international E.164 format.

The Initial Address Message IAM is analyzed in MSC1 whereby the calling party A2's number is detected in IAM. The calling party A2's number is compared/matched in MSC1 with the External A NumbeR EANR received from the LEMF. Analyze and match is represented in FIG. 5 with a reference sign M.

A match is found between the calling party A2 number in the Initial Address Message IAM and the received target identification EANR.

Intercept Related Information IRI related to the target A2 is sent 14 from IAP/GMSC to the Law Enforcement Monitoring Facility LEMF via the Delivery Function DF2.

Contents of Communications CC related to the target A2 is sent 15 from IAP/GMSC to the Law Enforcement Monitoring Facility LEMF via the Delivery Function DF3.

The invention is not limited to the above described embodiments. Other network configurations are possible to implement the invention. IP Multimedia Subsystem IMS is the technology defined by the Third Generation Partnership Project 3GPP to provide IP Multimedia services over mobile communication networks (3GPP TS 22.228, TS 23.228, TS 24.229, TS 29.228, TS 29.229, TS 29.328 and TS 29.329 Release 5 and Release 6). IMS provides key features to enrich the end-user person-to-person communication experience through the use of standardized IMS Service Enablers, which facilitate new rich person-to-person (client-to-client) communication services as well as person-to-content (client-to-server) services over IP-based networks. The IMS makes use of the Session Initiation Protocol SIP to set up and control calls or sessions between user terminals (or user terminals and application servers). The Session Description Protocol SDP, carried by SIP signaling, is used to describe and negotiate the media components of the session. IP Multimedia services provide a dynamic combination of voice, video, messaging, data, etc. within the same session. In a scenario involving IMS, the only way to intercept a call entering an MSC in a Public Land Mobile Network and coming from the IMS network is by means of the invention, checking the calling party number of the received Initial Address Message in the same way as described in the previous embodiments. Beyond an IMS network, other networks using SIP signaling, such as Non-IMS networks or SIP-I networks, can be considered for implementing the invention.

Figure 6:
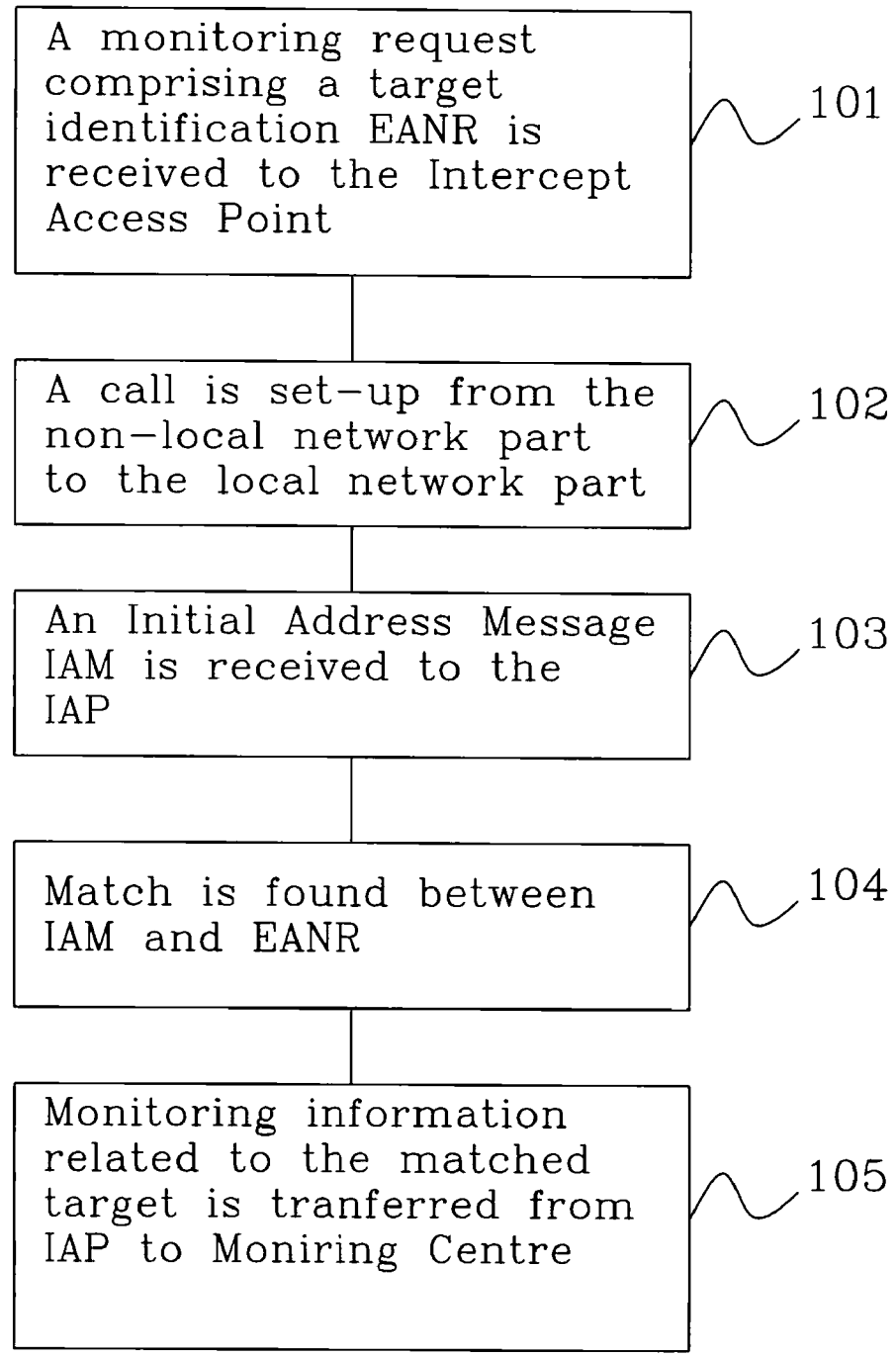
FIG. 6 discloses a flow chart illustrating some essential method steps of the invention.

FIG. 6 discloses a flow chart illustrating some essential method steps of the invention. The flow chart is to be read together with the earlier shown figures. The flow chart comprises the following steps:

A monitoring request comprising target identification is received from the monitoring centre MC to the Intercept Access point IAP. This step is shown in the figure with a block 101.

A call is set-up from an originating subscriber (A1, A2) in the non-local network part, to the local network part. This step is shown in the figure with a block 102.

An Initial Address Message IAM is received to the Intercept Access point IAP, from the non-local network part. This step is shown in the figure with a block 103.

A match is found between the Initial Address Message and the received target identification. This step is shown in the figure with a block 104.

monitoring information related to the matched target is transferred from the Intercept Access Point IAP to the monitoring centre. This step is shown in the figure with a block 105.

Figure 7:
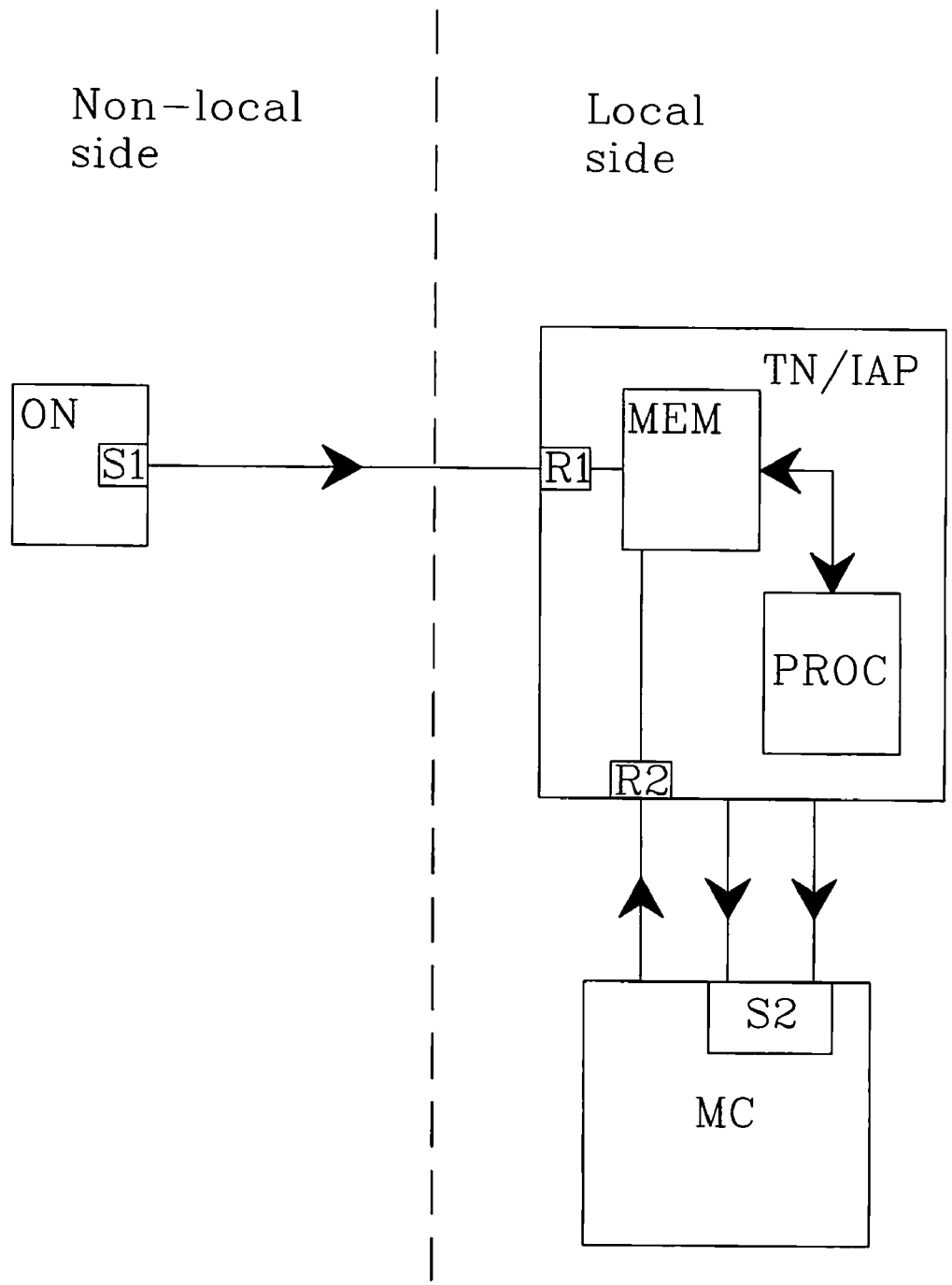
FIG. 7 schematically discloses a system that can be used to put the invention into practice.

A system that can be used to put the invention into practice is schematically shown in FIG. 7. The block schematic constellation corresponds in many parts to the ones disclosed in FIGS. 2 and 4. A non-local side comprises an Originating Node ON and a local side comprises a Terminating Node/Intercept Access Point TN/IAP. The TN/IAP comprises a memory unit MEM that is capable to store an Initial Address Message sent from an IAM-sender S1 on the non-local side and a target identification sent from a Monitoring Centre MC. An IAM-receiver R1 in TN/IAP receives the Initial Address Message from the non-local side and an ID-receiver R2 in TN/IAP receives target identification from a Monitoring Centre MC. The terminating node comprises a processor PROC that is capable to perform a comparison between values stored in the memory unit, and upon a found match between values, monitoring information related to the target is transmitted from the TN/IAP to the Monitoring Centre.

Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer.

The invention is thus not limited to the above described and in the drawings shown embodiments but can be modified within the scope of the enclosed claims.

The invention claimed is:

1. Method to monitor non-local originating calls in a telecommunication system comprising a local network part and a non-local network part, wherein a monitoring centre is attached to an Intercept Access Point in the local network part, the method comprising the following steps:
   receiving from the monitoring centre to the Intercept Access point, a monitoring request comprising an external target identification;
   setting-up a call from a subscriber in the non-local network part, towards the local network part;
   receiving to the Intercept Access Point a subscriber identity from the non-local network part;
   finding of a match between the subscriber identity and the received target identification;
   transferring monitoring information related to the matched target, from the Intercept Access Point to the monitoring centre.

2. The method to monitor non-local originating calls in a telecommunication system according to claim 1 wherein the local network part is a call terminating part and the non-local part is a call originating part.

3. The method to monitor non-local originating calls in a telecommunication system according to claim 1 wherein the local network part is a first telecommunication network and the non-local network part is a second telecommunication network.

4. The method to monitor non-local originating calls in a telecommunication system according to claim 1 wherein the local network part is a first node in a telecommunication network and the non-local network part is a second node in the telecommunication network.

5. The method to monitor non-local originating calls in a telecommunication system according to claim 1, wherein the target identification specifies an external calling party number.

6. The method to monitor non-local originating calls in a telecommunication system according to claim 1, wherein the target identification specifies an incomplete calling party number corresponding to an area identification.

7. An arrangement to monitor non-local originating calls in a telecommunication system that comprises a local network part and a non-local network part, wherein a monitoring centre is attached to an Intercept Access Point in the local network part, comprising:
   means to receive from the monitoring centre to the Intercept Access point, a monitoring request comprising an external target identification;
   means to set-up a call from a subscriber in the non-local network part, towards the local network part;
   means to receive from the non-local network part to the Intercept Access Point, a subscriber identity;
   means to detect a match between the subscriber identity and the received target identification;
   means to transfer monitoring information related to the matched target, from the Intercept Access Point to the monitoring centre.

8. The arrangement to monitor non-local originating calls in a telecommunication system according to claim 7 wherein the local network part is a call terminating part and the non-local part is a call originating part.

9. The arrangement to monitor non-local originating calls in a telecommunication system according to claim 8 wherein the local network part is a first telecommunication network and the non-local network part is a second telecommunication network.

10. The arrangement to monitor non-local originating calls in a telecommunication system according to claim 8 wherein the local network part is a first node in a telecommunication network and the non-local network part is a second node in the telecommunication network.

11. The arrangement to monitor non-local originating calls in a telecommunication system according to claim 7, wherein the target identification specifies an external calling party number.

12. The arrangement to monitor non-local originating calls in a telecommunication system according to claim 7, wherein the target identification specifies an incomplete calling party number corresponding to an area identification.

13. A node in a local network part for monitoring of non-local originating calls in a telecommunication system that comprises the local network part and a non-local network part, comprising:
   means in the node to receive a monitoring request comprising an external target identification;
   means in the node to receive from the non-local network part a subscriber identity;
   means in the node to detect a match between the subscriber identity and the received target identification;
   means in the node to return in response to the request, monitoring information related to the matched target.

14. A node in a local network part for monitoring of non-local originating calls in a telecommunication system that comprises the local network part and a non-local network part, comprising:
   an ID-receiver in the node aimed to receive a monitoring request comprising an external target identification;
   an IAM-receiver in the node aimed to receive a subscriber identity from the non-local network part;
   A comparison device in the node aimed to detect a match between the subscriber identity and the received target identification;

A sending device in the node aimed to return in response to the request, monitoring information related to the matched target.

15. A computer-readable medium having stored thereon a plurality of instructions, the plurality of instructions including instructions which, when executed by a processor, cause the processor to perform the steps of a method to monitor non-local originating calls in a telecommunication system that comprises a local network part and a non-local network part, wherein a monitoring centre is attached to an Intercept Access Point in the local network part, the steps comprising:

receiving from the monitoring centre to the Intercept Access point, a monitoring request comprising an external target identification;

setting up a call from an originating subscriber in the non-local network part, to the local network part;

receiving from the non-local network part to the Intercept Access point, a subscriber identity;

detecting a match between the subscriber identity and the received target identification;

transferring monitoring information related to the matched target, from the Intercept Access Point to the monitoring centre.

* * * * *

UNITED STATES PATENT AND TRADEMARK OFFICE
CERTIFICATE OF CORRECTION

PATENT NO. : 8,223,927 B2  
APPLICATION NO. : 12/867815  
DATED : July 17, 2012  
INVENTOR(S) : Di Serio et al.

Page 1 of 1

It is certified that error appears in the above-identified patent and that said Letters Patent is hereby corrected as shown below:

In Fig. 6, Drawing Sheet 6 of 7, for Tag "105", in Line 3, delete "tranferred" and insert -- transferred --, therefor.

In Fig. 6, Drawing Sheet 6 of 7, for Tag "105", in Line 4, delete "Moniring" and insert -- Monitoring --, therefor.

In Column 1, Line 17, delete "The" and insert -- the --, therefor.

In Column 7, Line 1, delete "both),"  and insert -- both)), --, therefor.

Signed and Sealed this  
Fifth Day of February, 2013

Teresa Stanek Rea  
*Acting Director of the United States Patent and Trademark Office*